United States Patent
Kuhlman (10) Patent No.: US 8,783,474 B2
(45) Date of Patent: Jul. 22, 2014

(54) GRAB BAR ROLLAWAY SHELF

(76) Inventor: Jeffrey G. Kuhlman, Island Park, NY (US)

( * ) Notice: Subject to any disclaimer, the term of this patent is extended or adjusted under 35 U.S.C. 154(b) by 83 days.

(21) Appl. No.: 13/506,351

(22) Filed: Apr. 13, 2012

(65) Prior Publication Data

US 2013/0270200 A1 Oct. 17, 2013

(51) Int. Cl.
- *A47F 5/08* (2006.01)
- *A47H 1/00* (2006.01)
- *A47K 10/04* (2006.01)
- *A47B 96/02* (2006.01)

(52) U.S. Cl.
CPC .............. *A47B 96/027* (2013.01); *A47K 10/04* (2013.01)
USPC ............ 211/90.02; 211/113; 211/123; 211/2; 211/90.01

(58) Field of Classification Search
CPC ......... A47K 10/04; A47K 1/09; A47K 10/10; A47K 10/08; D06F 57/12; A47B 23/04; A47B 96/027; A47B 55/02; A47B 96/00; A47B 96/028; A47B 96/06; A47B 96/02; A47B 96/021; A47B 96/024; A47B 96/061; A47B 96/062; A47B 96/063; A47B 47/00; A47G 25/0692; A47F 5/0006; A47F 5/0018; A47F 5/0037; A47F 5/0043; A47F 5/0062; A47F 5/0087; A47F 5/08; A47F 5/0807; E04G 5/06; E04G 5/061
USPC ........ 211/123, 124, 113, 90.01–90.04, 88.01, 211/193, 13.1, 86, 1, 87.01, 85.29, 105.1, 211/119.005, 134, 2; 108/42, 90, 28, 29, 108/31; 248/235, 250; 5/133, 136

See application file for complete search history.

(56) References Cited

U.S. PATENT DOCUMENTS

| | | | | |
|---|---|---|---|---|
| 846,359 | A | * 3/1907 | Sparmaker et al. | 108/94 |
| 1,201,595 | A | * 10/1916 | Kraemer | 248/215 |
| RE18,475 | E | 5/1932 | Timmons | |
| 2,175,421 | A | 10/1939 | Wright | 248/290 |
| 2,612,273 | A | * 9/1952 | Smith | 211/119.009 |
| 2,640,599 | A | * 6/1953 | McD. Hess | 108/29 |
| 3,096,731 | A | * 7/1963 | Lehman | 108/29 |
| 3,690,744 | A | 9/1972 | Squire | 312/351 |
| 3,702,591 | A | 11/1972 | Banse | 108/31 |
| 3,857,623 | A | * 12/1974 | Schneller | 312/266 |
| 4,108,084 | A | * 8/1978 | Fink | 108/29 |
| 4,372,449 | A | * 2/1983 | Fink | 211/88.04 |
| 4,827,849 | A | * 5/1989 | Vignale | 108/29 |

(Continued)

*Primary Examiner* — Jennifer E Novosad
(74) *Attorney, Agent, or Firm* — Richard B. Klar, Esq.; Law Office Richard B Klar (57) ABSTRACT

A grab handle mechanism includes a rotatable shelf so that when the grab bar is not used by a person who needs assistance walking it can be rolled on top of the bar camouflaging the bar and can be used for shelving. In addition the shelf can be rotated from a first position above the grab bar where it is disposed in a horizontal plane and camouflages the grab bar to a second position below the grab bar where the shelf is again disposed in a horizontal plane so the grab bar can be used by a person requiring its use for assistance. The shelves can be glass or plastic or other material. In an alternate embodiment instead of a shelf, a basket with a latched lid can be used so that when turned below the bar for use of the bar the contents of the basket do not spill out.

9 Claims, 8 Drawing Sheets

(56) References Cited

U.S. PATENT DOCUMENTS

| | | | |
|---|---|---|---|
| 4,870,907 A * | 10/1989 | McKee | 108/42 |
| 5,169,010 A * | 12/1992 | Fortner | 211/86.01 |
| 5,181,621 A * | 1/1993 | Plaehn | 211/88.01 |
| 5,365,623 A | 11/1994 | Springer | 5/658 |
| 5,398,824 A * | 3/1995 | Wolff et al. | 211/88.04 |
| 5,433,152 A * | 7/1995 | Henry | 108/42 |
| 5,467,486 A * | 11/1995 | Guenther | 4/578.1 |
| 5,499,584 A * | 3/1996 | Taylor | 108/96 |
| 5,711,434 A * | 1/1998 | Adams | 211/86.01 |
| 5,921,410 A * | 7/1999 | Emery et al. | 211/88.01 |
| 6,199,546 B1 * | 3/2001 | Freemon | 126/25 B |
| 6,220,461 B1 * | 4/2001 | Dickinson | 211/90.01 |
| 6,290,075 B1 * | 9/2001 | Cheimets et al. | 211/90.03 |
| 6,305,741 B1 | 10/2001 | Fernandez | 297/14 |
| 6,561,364 B1 * | 5/2003 | Brunsden | 211/90.01 |
| 6,698,602 B2 * | 3/2004 | Taylor | 211/74 |
| 6,726,036 B2 * | 4/2004 | Koellner | 211/104 |
| 6,866,157 B2 * | 3/2005 | Shone | 211/90.03 |
| 6,920,989 B2 * | 7/2005 | Lin | 211/87.01 |
| 7,395,765 B1 | 7/2008 | Dorfman | 108/48 |
| 7,516,853 B1 * | 4/2009 | Murillo, Jr. | 211/90.01 |
| 7,523,900 B1 * | 4/2009 | Hlatky | 248/201 |
| 2008/0093518 A1 | 4/2008 | Roth | 248/207 |
| 2010/0102193 A1 | 4/2010 | Lindner et al. | 248/534 |
| 2011/0203078 A1 | 8/2011 | Farrow, Sr. | 244/111 |

\* cited by examiner

GRAB BAR ROLLAWAY SHELF

BACKGROUND

1. Field

The present disclosure relates to a Grab Bar Rollaway Shelf Device for providing assistance to persons with some form of disability for ambulating around an area without the need for artificial side aides such as walkers and canes. In particular, the present disclosure provides for a grab handle mechanism with a rotatable shelf so that when the grab bar is not used by a person who need assistance walking it can be rolled on top of the bar camouflaging the bar and used for shelving. The shelves can be glass or plastic or other material. In an alternate embodiment instead of a shelf, a basket with a latched lid can be used so that when turned below the bar, for use of the bar, the contents of the basket do not spill out.

2. Related Prior Art

U.S. Patent Publication No. 2011/0203078 (Farrow, S R.; David L.) discloses a grab bar that attaches to an existing handrail and has an adjustable support leg that attaches to wall or floor to provide better stability when weight is applied. The grab bar rotates from a vertical stored position to a horizontal in-use position to allow for better/safer mobility around a home bathroom or public toilet stall.

U.S. Reexamined Pat. RE18475 (Samuel E. Timmons) discloses a foldable wall table designed for small rooms, means are provided whereby when the table is not in use, it will be supported in an upstanding position against the wall, but when in use, can be held firmly in a laterally extended position against wall.

U.S. Pat. No. 6,305,741 (Fernandez; Martin) relates to a foldable chair with a handle; FIG. 1 shows the chair open; FIG. 2 shows a view of chair to be used as a handle for assisting a user in getting out of a tub.

SUMMARY

The present disclosure provides for a grab handle mechanism with a rotatable shelf so that when the grab bar is not used by a person who needs assistance walking, it can be rolled on top of the bar camouflaging the bar and used for shelving. In addition, the present disclosure provides for a shelf in combination with a grab bar where the shelf can be rotated from a first position above the grab bar where it is disposed in a horizontal plane to a second position below the grab bar where the shelf is again disposed in a horizontal plane. The shelves can be glass or plastic or other material. In an alternate embodiment instead of a shelf, a basket with a latched lid can be used so that when turned below the bar, for use of the bar, the contents of the basket do not spill out. In addition, decorative items such as but not limited to small vases, picture frames, statues, etc may be affixed to the top of the shelf. In this way the shelf provides for a more decorative camouflage for the grab bar.

DETAILED DESCRIPTION OF THE PREFERRED EMBODIMENTS

Figure 1:
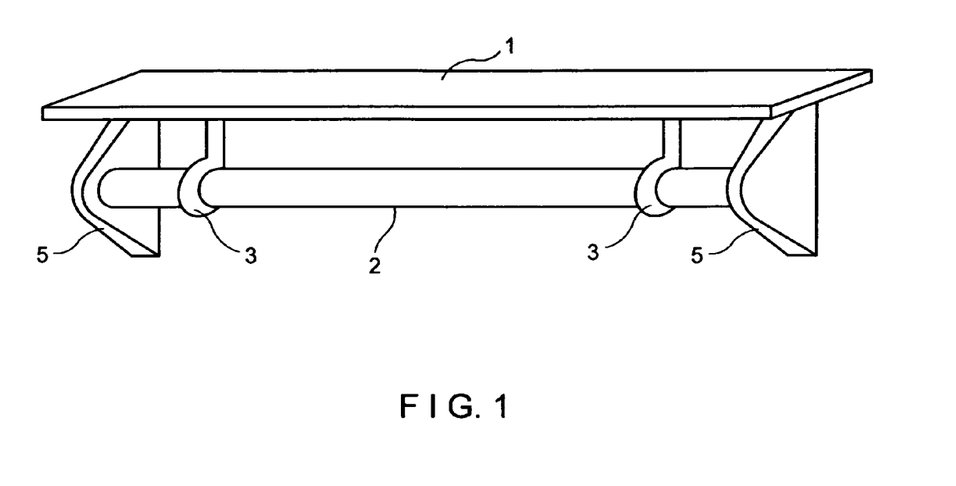
FIG. 1 is a front view showing the shelf in place above the grab bar in accordance with the teachings of the present disclosure.

Referring now to the drawings of FIGS. 1-7, FIG. 1 illustrates the present disclosure that includes a shelf 1 connected to a bar 2 or a grab bar 2. In FIG. 1 the shelf 1 is connected to the grab bar 2 preferably by but not limited to clips 3 that attach to the underside of the shelf 1. The clips 3 can attach to the shelf using either screws, bolts or an adhesive or any other known mechanism. The clip 3 may be made of a variety of materials including but not limited to metal, rubber and plastic although plastic is preferred as it will not corrode, rust, disintegrate or lose its shape so it will continue to tightly grip the bar. This is particularly important should the grab bar be located in an area where it is likely to be exposed to wet/damp conditions such as a bathroom. If the clips are attached by screws or bolts, the screws and bolts should be made of a non-rusting non corrosive material like stainless steel. Most grab bars are ¾" diameter so the clip must also be a ¾" clip. However, clips with various diameters can be used to correspond to the diameter of the particular grab bar involved-provided the size of the clip matches the size of the bar. In some instances only one clip may be used provided the shelf is small enough and rigid enough that one clip will support it and also provide enough space for the user to grip the grab bar once it is rotated out of the way. The grab bar must be attached to the wall horizontally. The shelf may also be made of a variety of materials including but not limited to wood, metal, glass and plastic—the last two are especially useful when the shelf attachment is used in a bathroom/shower where they are likely to become wet and the danger of rotting and/or rusting is a factor. Plastic shelves are also recommended as the shelf and clips can be molded out of one piece thereby eliminating the need to attach the clips to the underside of the shelf which will reduce the cost of manufacturing the device by eliminating the cost of purchasing the clips and the labor involved in attaching the clips to the shelf.

The length of the shelf 1 can vary depending upon the size of the grab bar 2. However, the width of the shelf should be no more than two times the distance separating the grab bar from the wall. If too much of the shelf extends away from the wall beyond the point where it is attached to the bar, there is a risk that too much weight from the stored items will be placed on outer part of the shelf thereby causing it to rotate out of position and causing the stored items to fall.

The distance between the clips can vary depending upon the size of the grab bar but must at least be separated by a distance sufficient to allow the user to be able to reach between the clips and grab the bar when the shelf has been rotated out of position. It is understood that the present disclosure is not limited to clips as the only mechanism for attachment of the shelf to the bar and any other known mechanism can be utilized as well.

Figure 3:
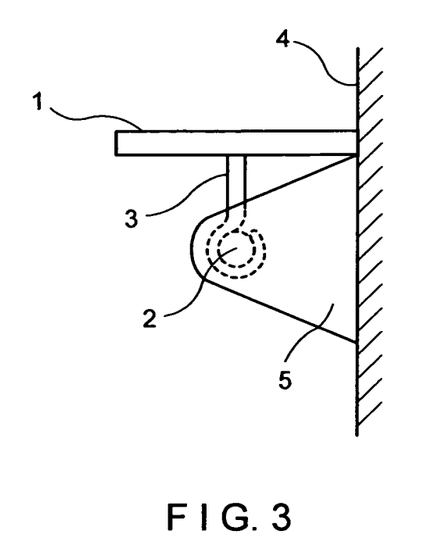
FIG. 3 is a partial side view of the present disclosure with shelf above the grab bar.
Figure 5:
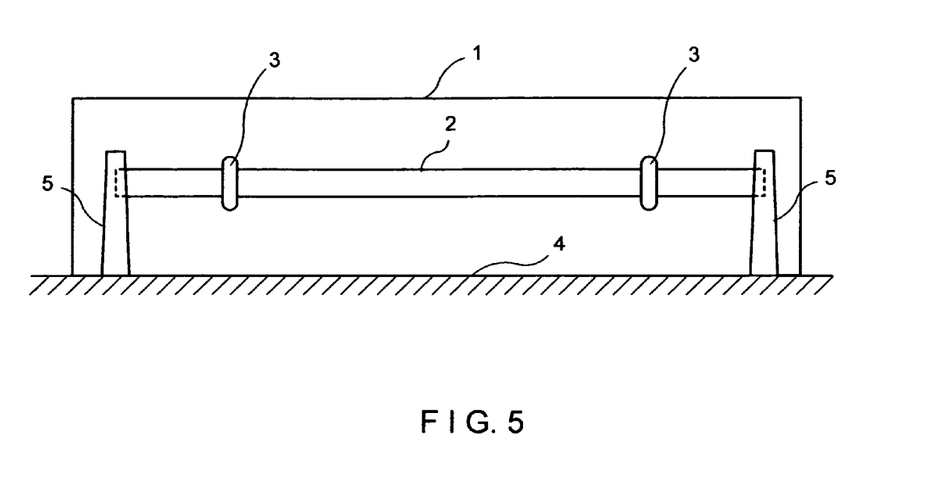
FIG. 5 is a bottom view of the present disclosure with above the grab bar.

In FIG. 1, the shelf is shown in a first position where the shelf is in place above the grab bar. In this position the shelf camouflages the grab bar and provides for a shelf for use. This can be used in any room such as living room but also the bathroom and in the shower where the shelf can be used for bathing products and towels prior to bathing or showering. FIG. 3 is partial side view of the shelf in this position. FIG. 5 is a bottom view of the present disclosure with the shelf rotated above the grab bar supported by a bracket 5 and attached to a wall 4—the position shown in FIG. 1.

Figure 2:
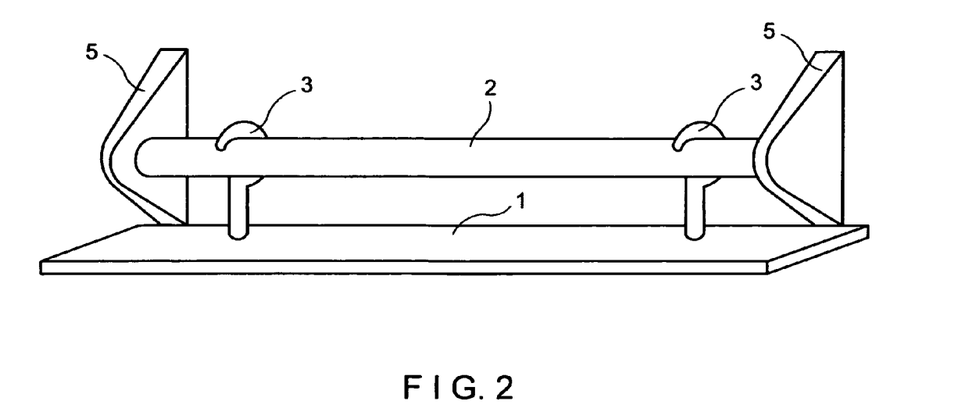
FIG. 2 shows a front view of the present disclosure with the shelf rotated downward and under the grab bar while still attach to the grab bar.
Figure 4:
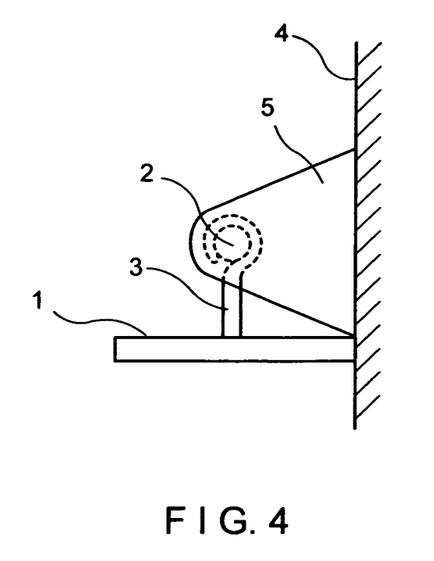
FIG. 4 is a partial side view of the present disclosure with the shelf rotated shelf rotated downward and under the grab bar.
Figure 6:
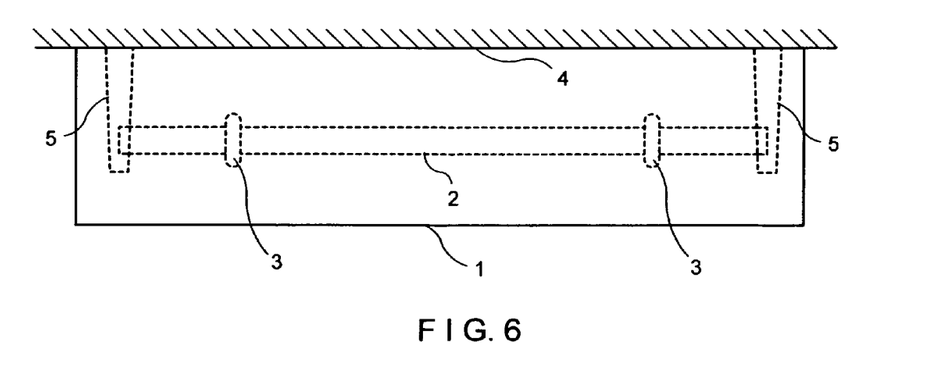
FIG. 6 is top view showing the present disclosure with the shelf rotated downward and out of position enabling a user to use the grab bar.

In FIG. 2 the shelf 1 is rotated downward to a second position and under the grab bar 2 while still attached to the grab bar 2. In this position the grab bar 2 can be used by a person requiring assistance to maneuver in the area near the grab bar. FIG. 4 is a partial side view of the shelf in this second position again supported by the bracket 5 and attached to the wall 4. FIG. 6 is a top view showing the shelf rotated downward into the second position shown in FIG. 2.

Figure 8:
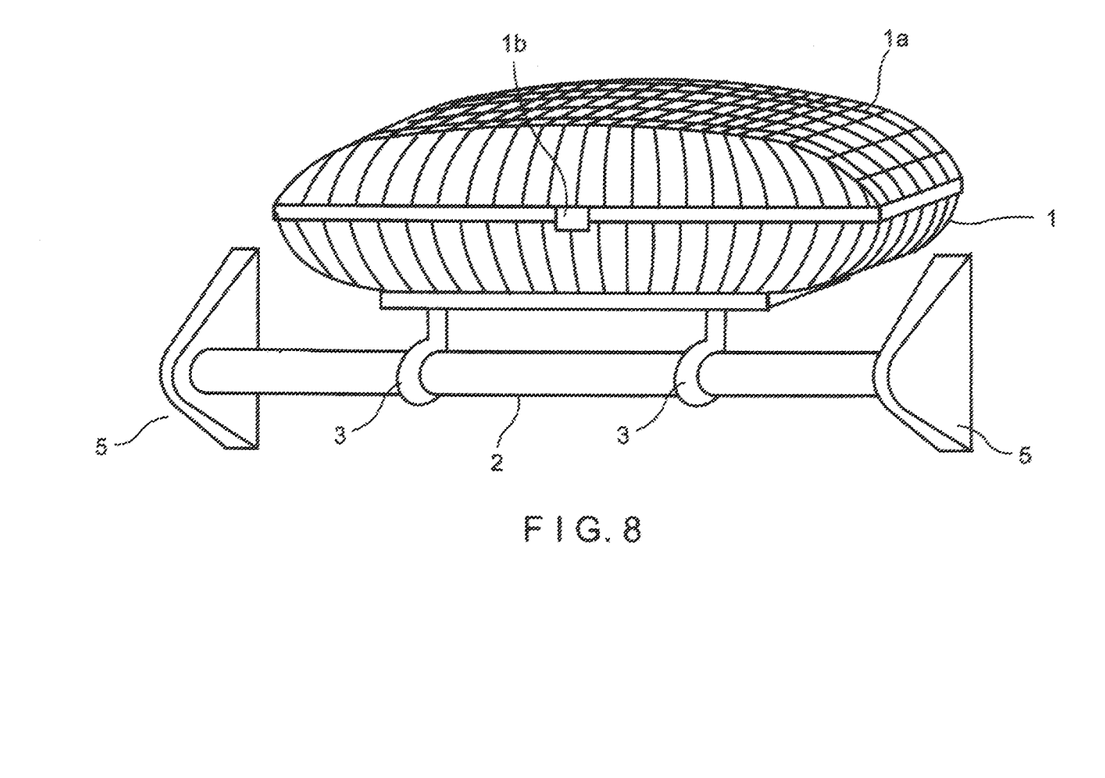
FIG. 8 is another embodiment of the present invention in which the shelf is configured as a basket with a top cover fastened to the basket.
Figure 9:
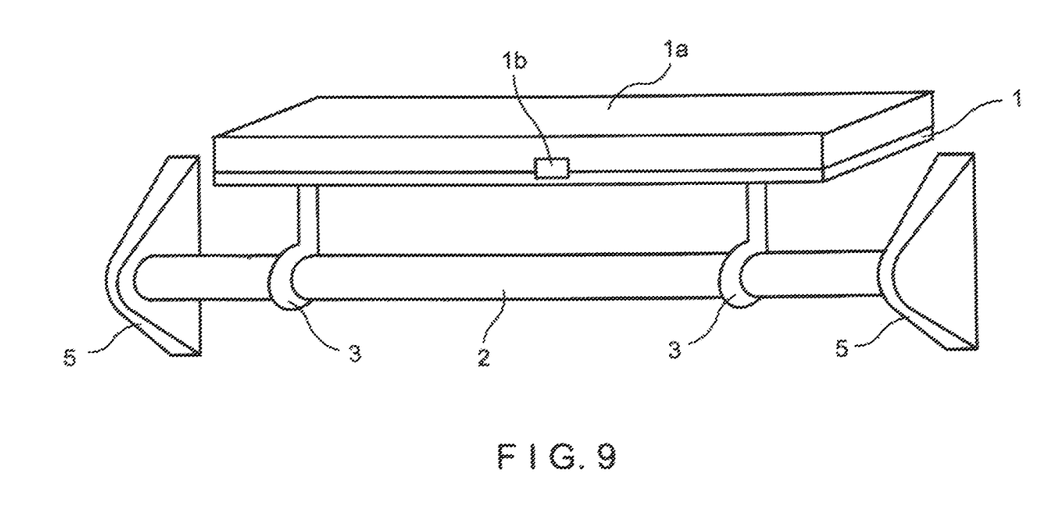
FIG. 9 is another embodiment of the present invention in which the shelf has a top cover that is fastened to enclose the shelf to prevent the contents from spilling out due to rotation showing the top cover in a closed and fastened position.
Figure 10:
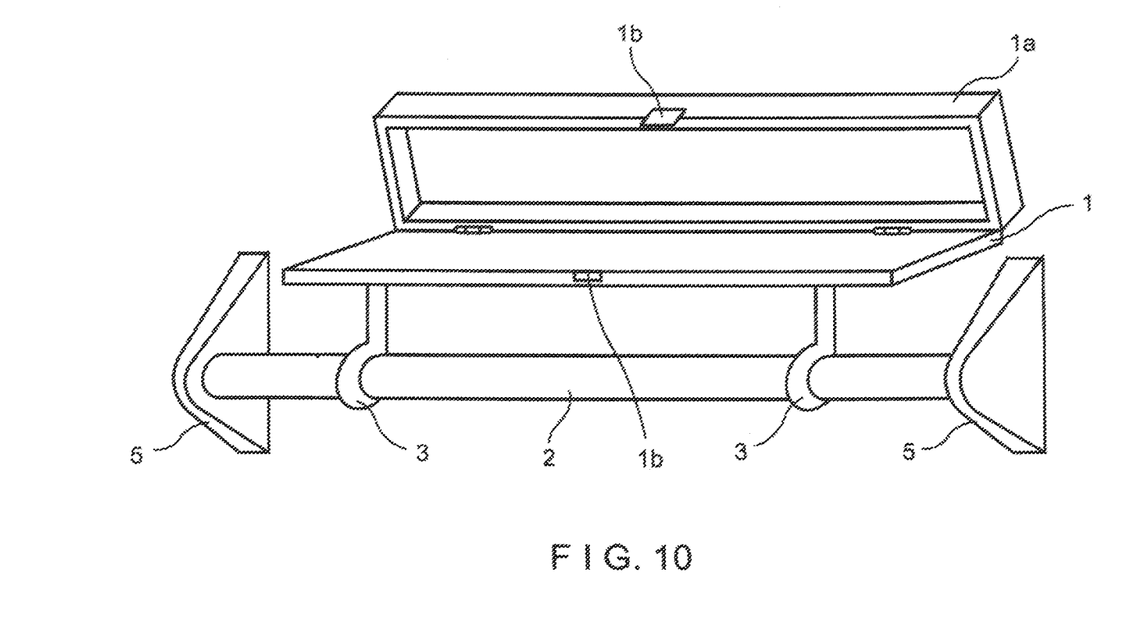
FIG. 10 is the embodiment of FIG. 9 showing the top cover in an opened and unfastened position.
Figure 11:
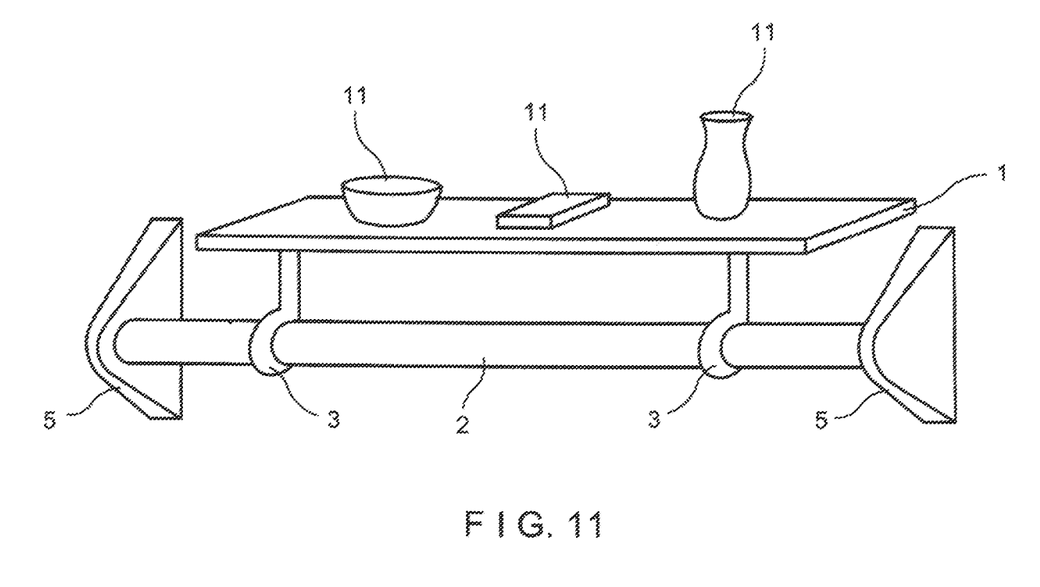
FIG. 11 is another embodiment of the present invention showing decorative items affixed to the top of the shelf of the present invention to provide a decorative camouflage for the grab bar.

In another embodiment (FIG. 8) the shelf 1 can be configured as a basket with a top cover 1a that can be fastened to the basket 1' by a fastener 1b so that when the shelf 1 is rotated from the first position in FIG. 1 to the second position in FIG. 2 the contents inside the basket do not spill out of the basket. It is further understood that any shelf 1 can have a close covering to prevent the shelf's contents from spilling out during rotation of the shelf 1 from above the bar to below the bar 2 as shown respectively in FIGS. 1 and 2. Alternatively in another embodiment shown in FIGS. 9 and 10, the shelf 1 can have a top cover 1a that is fastened by a fastener 1b to prevent the items from spilling out during rotation of the shelf 1. FIG. 9 shows the top cover 1a in a closed and fastened position. FIG. 10 showing the top cover 1a in an opened and unfastened position.

Figure 7:
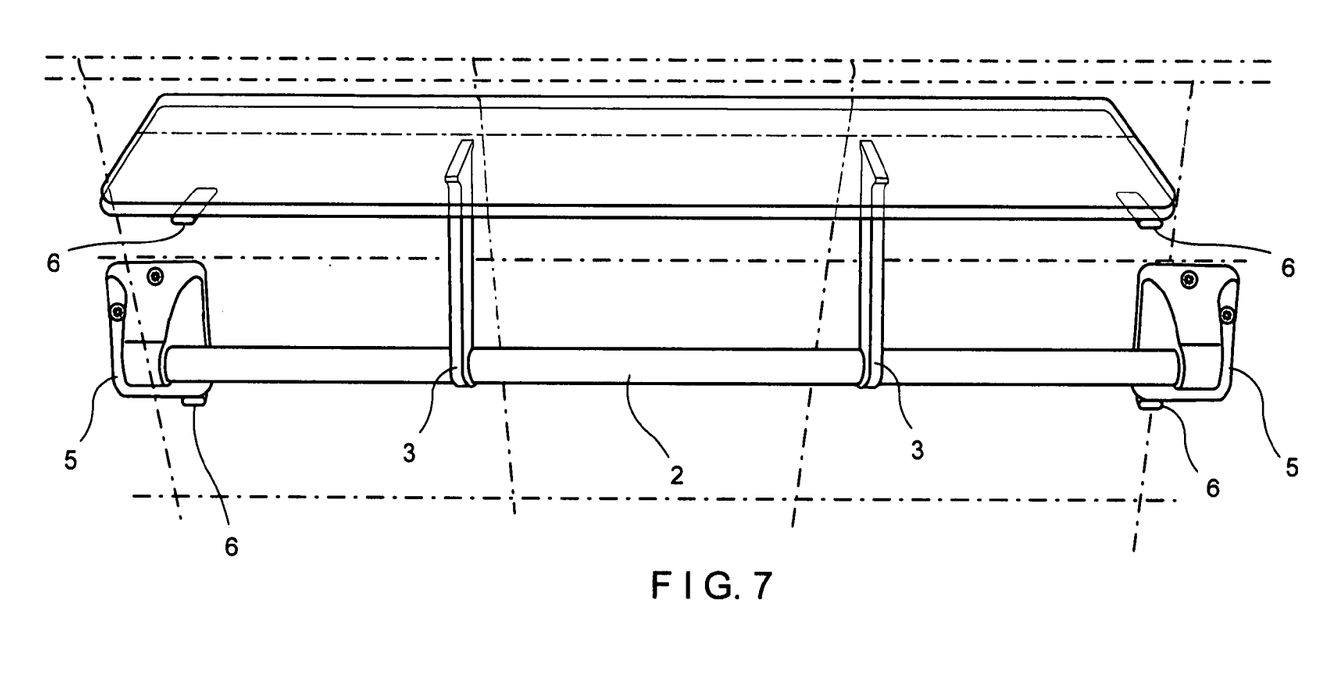
FIG. 7 is another embodiment of the present disclosure in which pads are used particularly where the shelf is made of glass to prevent the glass shelf from breaking during rotation

FIG. 7 shows another embodiment of the present disclosure in which a small pad 6 is attached to the underside of the shelf at the 2 points where the shelf will come into contact with the bottom of the grab bar bracket. The pad 6 can also be attached to the bottom of the bracket to allow for the user to shift the shelf 1 back and forth on the bar. The pad 6 can be made of any material but rubber or vinyl is preferred as they provide flexibility and are suitable for use in areas where moisture is present. The pads 6 are attached by adhesive material. A rubber or vinyl strip can also be attached to the perimeter of the shelf 1 in cases where the shelf extends far enough from the bar that it will contact the wall rather than the bracket. These additions are most suitable where the shelf 1 is made of glass and there is a risk of the glass shelf 1 breaking if it is rotated too quickly.

The present disclosure is particularly suitable for use in hotel and motel rooms that typically set aside handicap accessible rooms with multiple sets of grab bars 2. In this way, grab bars 2 can be available throughout rooms and still be camouflaged as shelving when not in use so as to avoid an unsightly appearance. In addition, decorative items such as but not limited to small vases, picture frames, statues, etc may be affixed to the top of the shelf 1. In this way the shelf 1 provides for a more decorative camouflage for the grab bar 2.

While presently preferred embodiments have been described for purposes of the disclosure, numerous changes in the arrangement of method steps and apparatus parts can be made by those skilled in the art. Such changes are encompassed within the spirit of the invention as defined by the appended claims.

What is claimed:

1. A grab handle mechanism, comprising:
a grab bar adapted to be attached to a vertical surface; and
a shelf having an upper surface and a lower surface and rotatably attached to and mounted onto the grab bar, said shelf being rotatable about said bar, while remaining attached to said grab bar, from a first position above the grab bar where it is disposed in a horizontal plane to a second position below the grab bar where the shelf is again disposed in a horizontal plane,
said shelf is securely and rotatably attached to said grab by one or more clips, each of said clips having a first end attached to said lower surface of said shelf and a second end firmly and rotatably mounted onto a circumferential perimeter of said grab bar to rotate said shelf about and substantially encircle the perimeter of said grab bar when the shelf is rotated between the first position and the second position,
wherein when said shelf is disposed in said first position each of said clips support the weight of the shelf above said grab bar and defining a space between the lower surface of said shelf and the perimeter of said grab bar such that items can be placed onto the upper surface of said shelf when said shelf is disposed in said horizontal plane, and
wherein when said shelf is disposed in said second position each of said clips holds the weight of the shelf in a suspended manner below said grab bar whereby said shelf does not interfere with said grab bar perimeter.

2. The mechanism according to claim 1 wherein said one or more clips attach to the shelf by either screws, bolts or an adhesive.

3. The mechanism according to claim 1 wherein said one or more clips are made of a variety of materials including but not limited to metal, rubber and plastic.

4. The mechanism according to claim 1 wherein said shelf is a basket with a top cover that can be fastened so that when the shelf is rotated from the first position in to the second position contents inside the basket do not spill out of the basket.

5. The mechanism according to claim 1 wherein the shelf has a top cover that can be fastened to enclose the shelf so that when the shelf is rotated from the first position in to the second position contents inside do not spill out.

6. The mechanism according to claim 1 wherein said shelf is made of glass.

7. The mechanism according to claim 1 wherein said shelf is made of plastic.

8. The mechanism according to claim 1 wherein decorative items are affixed to the upper surface of the shelf to provide for a more decorative camouflage for the grab bar.

9. The mechanism according to claim 8 wherein the decorative items include small vases, picture frames and statues.

* * * * *